(12) United States Patent
Sugata et al.

(10) Patent No.: US 11,774,374 B2
(45) Date of Patent: Oct. 3, 2023

(54) INSPECTION DEVICE

(71) Applicant: NanoSystem Solutions, Inc., Okinawa (JP)

(72) Inventors: Takashi Sugata, Okinawa (JP); Ryoji Kodama, Okinawa (JP)

(73) Assignee: NANOSYSTEM SOLUTIONS, INC., Okinawa (JP)

( * ) Notice: Subject to any disclaimer, the term of this patent is extended or adjusted under 35 U.S.C. 154(b) by 96 days.

(21) Appl. No.: 17/051,737

(22) PCT Filed: Apr. 23, 2019

(86) PCT No.: PCT/JP2019/017214
§ 371 (c)(1),
(2) Date: Oct. 29, 2020

(87) PCT Pub. No.: WO2019/212011
PCT Pub. Date: Nov. 7, 2019

(65) Prior Publication Data
US 2021/0231586 A1 Jul. 29, 2021

(30) Foreign Application Priority Data
May 1, 2018 (JP) .................................. 2018-088470

(51) Int. Cl.
*G01N 21/956* (2006.01)
*G01N 21/88* (2006.01)

(52) U.S. Cl.
CPC ....... *G01N 21/956* (2013.01); *G01N 21/8806* (2013.01); *G01N 2021/8809* (2013.01)

(58) Field of Classification Search
CPC ....... G01N 2021/8809; G01N 21/8806; G01N 21/9503; G01N 21/956
(Continued)

(56) References Cited

U.S. PATENT DOCUMENTS

2008/0030731 A1* 2/2008 Jin ..................... G01N 21/4738
356/417
2013/0016206 A1 1/2013 Zimmer et al.
2015/0330914 A1* 11/2015 Maleev .................. G01N 21/47
356/237.5

FOREIGN PATENT DOCUMENTS

JP 5-126748 5/1993
JP 10-339704 12/1998
(Continued)

OTHER PUBLICATIONS

International Search Report issued in corresponding application No. PCT/JP2019/017214.
(Continued)

*Primary Examiner* — Tri T Ton
(74) *Attorney, Agent, or Firm* — Cozen O'Connor

(57) ABSTRACT

There is provided an inspection device allowing surely measuring irregular-shaped parts such as a bevel of a wafer while saving space. An inspection device 100 is provided with outer periphery illuminating units 11, 111 for illuminating an outer peripheral region AP of a wafer WA being a target, and an outer periphery imaging unit that images the outer peripheral region AP of the wafer WA. The outer periphery illuminating units 11, 111 have arcuate illuminating units 11a, 111a that are arranged along a partial region of a circumference CI centered on a reference axis SA and illuminate a predetermined region A1 on the reference axis SA, and the reference axis SA of the arcuate illuminating units 11a, 111a extends in a direction crossing the tangent direction along which an outer peripheral part UA of the wafer WA extends.

10 Claims, 7 Drawing Sheets

(58) Field of Classification Search
USPC ..................... 356/237.1–237.6, 239.1–239.8
See application file for complete search history.

(56) References Cited

FOREIGN PATENT DOCUMENTS

| | | |
|---|---|---|
| JP | 2003-243465 | 8/2003 |
| JP | 2006-220540 | 8/2006 |
| JP | 2007-123561 | 5/2007 |
| JP | 2009-535782 | 10/2009 |
| JP | 2016-178298 | 10/2016 |
| JP | 2018-63207 | 4/2018 |
| KR | 10-2009-0040572 | 4/2009 |

OTHER PUBLICATIONS

Office Action dated Feb. 15, 2023 issued in Japanese Patent Application No. 2020-517051.
Office Action dated Dec. 6, 2022 issued in Taiwanese Patent Application No. 108113700.

* cited by examiner

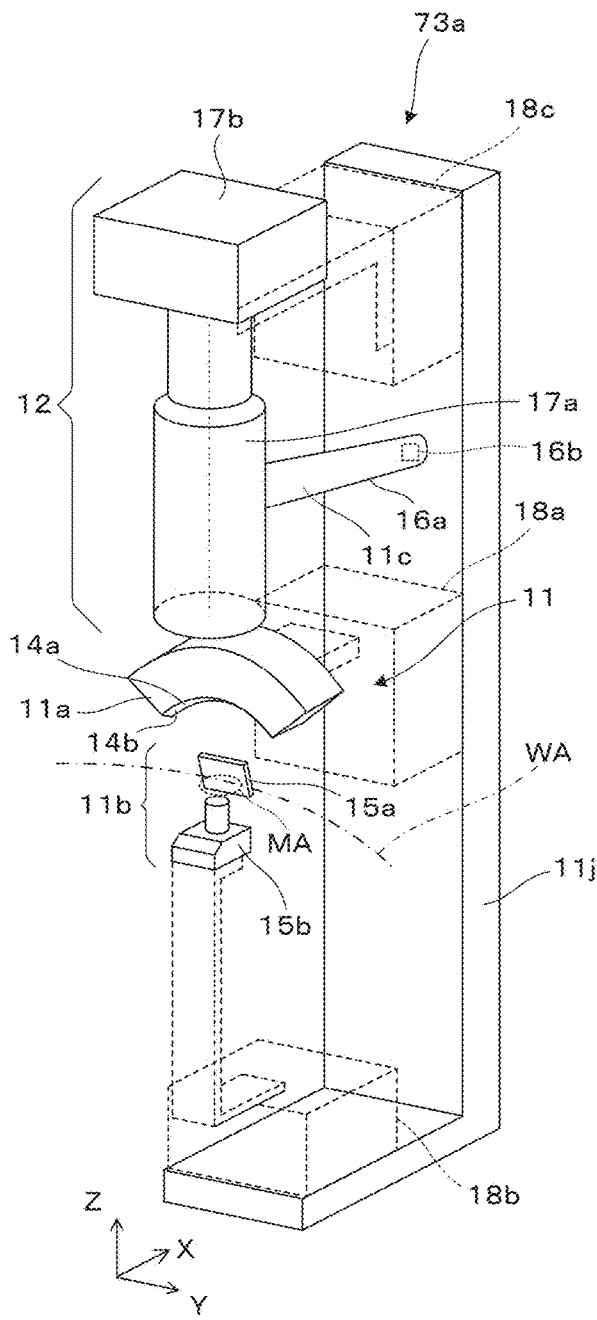
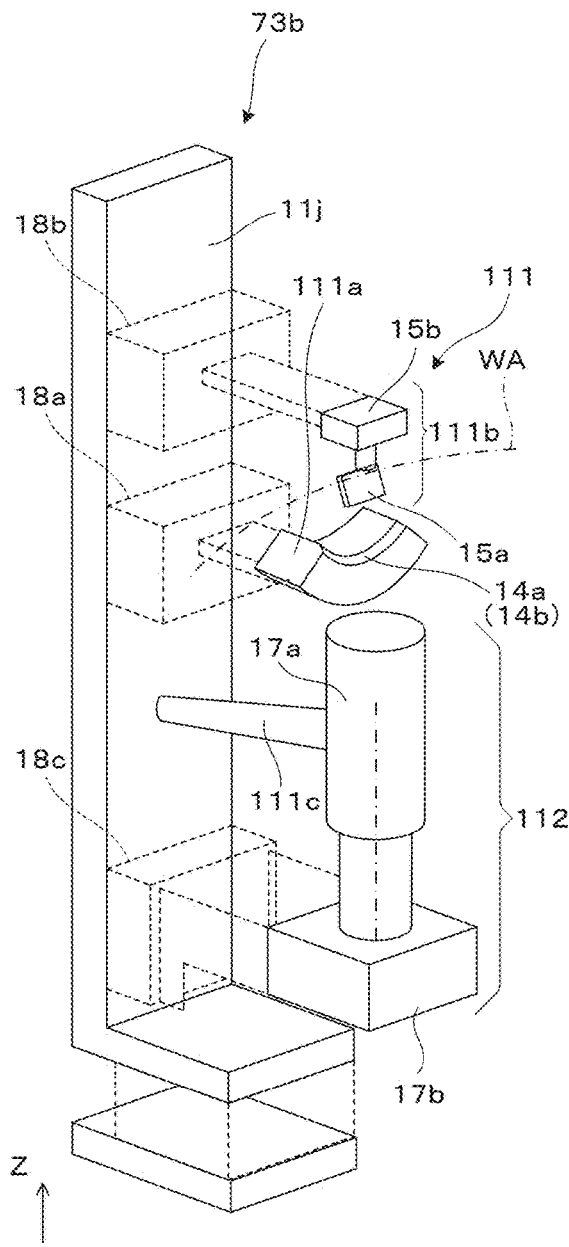

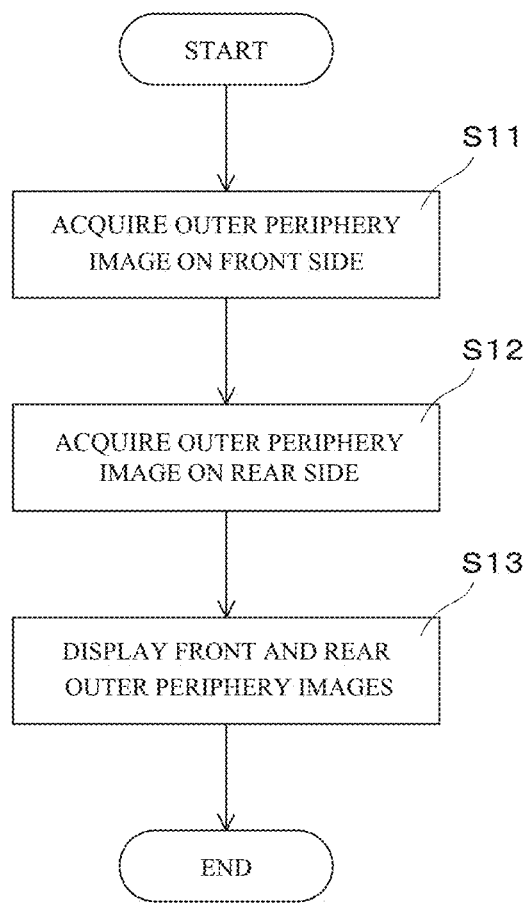

INSPECTION DEVICE

RELATED APPLICATIONS

This is a U.S. National Phase Application under 35 USC 371 of International Application PCT/JP2019/017214 filed on Apr. 23, 2019.

This application claims the priority of Japanese application no. 2018-088470 filed May 1, 2018, the entire content of which is hereby incorporated by reference.

FIELD OF THE INVENTION

The present invention relates to an inspection device for measuring a state of an outer periphery of a target, and particularly to an inspection device for measuring a target having a sloping part or a depressed part on an outer periphery.

BACKGROUND OF THE INVENTION

As an inspection device, there is a wafer edge inspection device for detecting chipping generated on a bevel formed at an edge of a wafer. As such a wafer edge inspection device, an inspection device is known, which is provided with a dome shape illuminator formed with a hemisphere surface body having a reflection surface on an inside surface, disposed so that a central axis of the hemisphere surface lies on a central surface of a wafer on a placer, and irradiates a region containing bevel of the wafer in an imaging region; and an imager that has an optical axis which is approximately orthogonal to the central surface of the wafer and disposed in a position crossing a bevel vicinity of the wafer to which light is irradiated by the illuminator, images a region containing the bevel of the wafer in the imaging region (see, Japanese Patent Laid-Open No. 2016-178298).

However, in Japanese Patent Laid-Open No. 2016-178298, the illumination in a dome shape becomes larger and space-saving is not easy, to make the size of an inspection device larger. Meanwhile, in an instance of a wafer edge inspection device, a single inspection unit is not often built in, but many inspection units with different functions or mechanisms are frequently implemented in a limited space, and the need for space-saving of respective inspection units have increased.

SUMMARY OF THE INVENTION

The present invention has been made in consideration of the above-described problem in the background, and is directed to provide an inspection device that has a reduced space allowing surely measuring of irregular-shaped parts such as a bevel of a wafer.

To achieve the above-described purpose, an inspection device according to the present invention is provided with an outer periphery illuminating unit for illuminating an outer peripheral region of a target; and an outer periphery imaging unit for imaging the outer peripheral region of the target, wherein the outer periphery illuminating unit has an arcuate illuminating unit arranged along a partial region of a circumference centered on a reference axis for illuminating a predetermined region on the reference axis; and wherein the reference axis of the arcuate illuminating unit extends in a direction crossing a tangent direction along which an outer peripheral part of the target extends.

In the above-described inspection device, taking into consideration the reference axis that extends along a direction crossing a tangent direction along which an outer peripheral part of a target extends, an outer periphery illuminating unit has an arcuate illuminating unit for illuminating a predetermined region on the reference axis, and therefore it is possible to illuminate efficiently an irregular-shaped part such as a sloping part toward an outer edge or a depressed part having receded from the outer edge in the outer periphery imaging area, and to save a space of the outer periphery illuminating unit.

According to a specific aspect of the present invention, in the above-described inspection device, the reference axis of the arcuate illuminating unit extends in a direction orthogonal to the tangent direction, and the predetermined region on the reference axis corresponds to a place through which a boundary location between a flat part and a sloping part outside the flat part, or a vicinity thereof, in the outer peripheral region of the target passes. In this instance, illumination for an outer edge of the flat part or depressed part becomes uniform and chipping and other defects can be measured precisely.

According to another aspect of the present invention, the reference axis of the arcuate illuminating unit extends in parallel to the flat part.

According to yet another aspect of the present invention, the arcuate illuminating unit is arranged within an angle range of not more than 180° around the reference axis.

According to yet another aspect of the present invention, the outer periphery illuminating unit has a slope-illuminating unit for illuminating, from an oblique direction, a place through which the outermost sloping part in the outer peripheral region of the target passes. In this instance, the sloping part is surely illuminated.

According to yet another aspect of the present invention, the slope-illuminating unit has a reflecting part that is arranged facing a place through which a sloping part of the outer peripheral region of the target passes, and a light supplying part for supplying illumination light to the reflecting part. In this instance, illumination for the sloping part can be made suitable by angle adjustment of the reflecting part.

According to yet another aspect of the present invention, the reflecting part has a light diffusing property. In this instance, uniformity in the illumination for the sloping part can be enhanced.

According to yet another aspect of the present invention, the outer periphery illuminating unit has an episcopic illuminating unit built in an optical imaging system of the outer periphery imaging unit and illuminates a flat part in the outer peripheral region of the target. In this instance, illumination for the flat part becomes efficient by the episcopic illuminating unit.

According to yet another aspect of the present invention, a transport part is further provided, which turns over a target to a retentive part for supporting the target at an inspection location of an outer periphery inspection unit having the outer periphery illuminating unit and the outer periphery imaging unit.

According to yet another aspect of the present invention, plural additional inspection units are further provided, for inspecting an outer periphery of the target with a mechanism different from that of an outer periphery inspection unit having the outer periphery illuminating unit and the outer periphery imaging unit.

BRIEF DESCRIPTION OF DRAWINGS

FIG. 2A is a conceptual perspective view that explains a first outer periphery imaging unit for an upper surface, constituting the outer periphery inspection unit, and FIG. 2B is a conceptual perspective view that explains a second outer periphery imaging unit for a lower surface, FIG. 6 is a view that explains an example of operation of an outer periphery and rear surface defect inspection multifunction machine.

DETAILED DESCRIPTION OF EMBODIMENTS

Figure 1A:
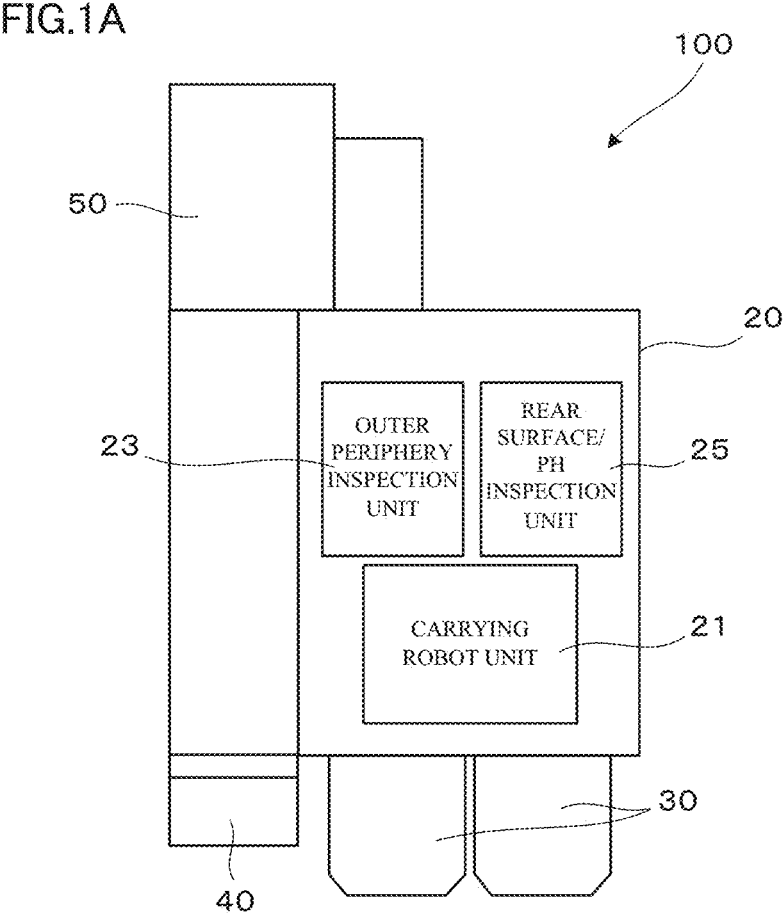
FIG. 1A is an overall plan view of an inspection device.

Hereinafter, with referring to the drawings, an embodiment of the inspection device according to the present invention will be explained. The present inspection device 100 is an outer periphery and rear surface defect inspection multifunction machine, and a target for inspection is, for example, a wafer of semiconductor crystal such as Si or the like.

As shown in FIG. 1A, the inspection device (outer periphery and rear surface defect inspection multifunction machine) 100 has a main body section 20 composed of a carrying robot unit 21, an outer periphery inspection unit 23 and a rear surface/PH inspection unit 25; a load port 30 for carrying in and out a wafer; an interface part 40 for exchanging information or instructions to/from an operator; and an electric system rack 50.

In the main body section 20, the outer periphery inspection unit 23 optically detects without contact a defect or roughness of an outer peripheral part of a wafer as or being an object to be inspected, and determines pass/fail grading by image processing. The rear surface/PH inspection unit 25 optically detects scratches and particles lying on the rear surface of the wafer being an object to be inspected and pinholes (bubbles) lying in the inside of the wafer, and to determines pass/fail grading by image processing. Specifically, the rear surface/PH inspection unit 25 illuminates the rear surface of the wafer supported with a non-illustrated grip device by visible light from beneath, images generated scattered light with a non-illustrated camera, and detects scratches and particles by image processing. Moreover, the rear surface/PH inspection unit 25 illuminates the rear surface of the wafer by infrared light from beneath, images transmitted light with a non-illustrated camera, and detects pinholes by image processing.

Figure 1B:
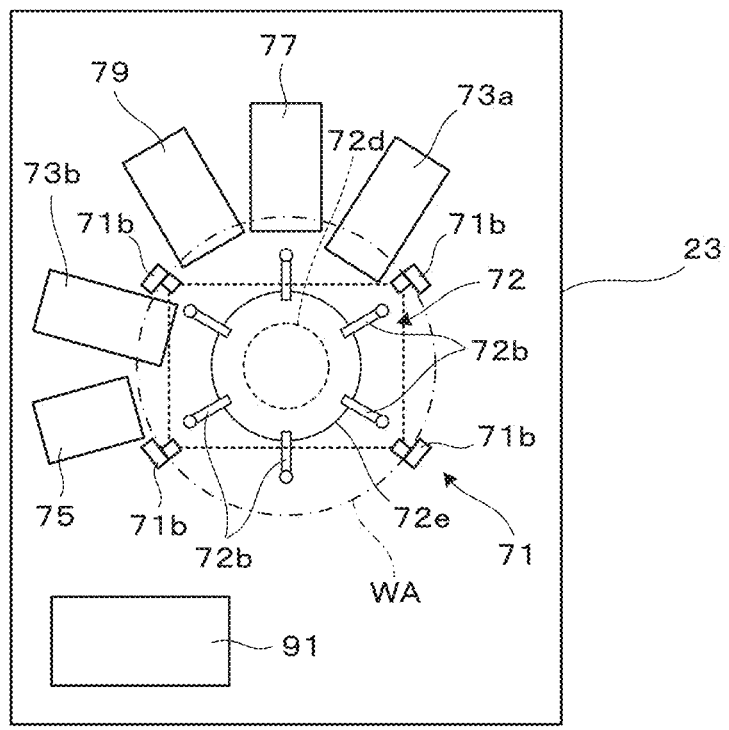
FIG. 1B is a plan view that explains an outer periphery inspection unit in the inspection device.

As shown in FIG. 1B, the outer periphery inspection unit 23 is provided with a first outer periphery inspection unit 73a, a second outer periphery inspection unit 73b, a notch camera part 75, a laser box part 77, an edge camera part 79, and a control part 91 that controls respective parts. The notch camera part 75, the laser box part 77, and the edge camera part 79 are additive inspection units for inspecting the outer periphery of the wafer WA being a target by mechanisms different from that of the first and second outer periphery inspection units 73a, 73b.

The first outer periphery inspection unit 73a is a part for performing, with respect to the wafer WA supported rotatably with plural support arms 72b, inspection of an outer periphery upper surface thereof and inspection of a notch upper surface, and the second outer periphery inspection unit 73b is a part for performing inspection of an outer periphery lower surface of the wafer WA and inspection of a notch lower surface. Both outer periphery inspection units 73a, 73b illuminate the outer periphery and notch of the wafer WA with three kinds of illumination systems including a white light source from above and beneath and from an oblique direction, and photograph the outer periphery and notch of the wafer WA from above and beneath, to thereby detect defects on the outer periphery of the wafer WA and in a position of the notch. Finding of defects is useful for detecting beginning of a crack in the wafer WA. The notch camera part 75 is a part for inspecting the notch, and detects defects in the notch by illuminating the notch formed on the outer periphery of the wafer WA with a panel illumination system incorporating a red LED and photographing the notch from a side direction with a monochrome type CCD camera. The laser box part 77 is an outer periphery end surface inspection unit for sensing with use of a laser. The laser box part 77 irradiates an outer peripheral part of rotating wafer WA with laser light, and makes a list of suspected defects according to a level of scattered light. The edge camera part 79 is a part for inspecting an end surface of the wafer WA. The edge camera part 79 is composed of two line sensors, and images the end surface of rotating wafer WA from obliquely downward and upward directions under illumination with a white LED or a white C type ring illumination device whose illustration is omitted.

In the outer periphery inspection unit 23, there are provided a lifter unit 71 that performs decentering alignment with respect to the wafer WA, and a retentive part 72 for arranging suitably and rotating suitably the wafer WA relative to respective parts 73a, 73b, 75, 77 and 79 for inspection. The retentive part 72 supports the wafer WA being a target for inspection in inspection locations of respective parts 73a, 73b, 75, 77 and 79 for inspection. The retentive part 72 receives the wafer WA in a horizontally extending state from four fulcrum-shaped lifter arms 71b provided in the lifter unit 71 being a transport part to many support arms 72b provided with an O-ring at the apex. These support arms 72b are supported with a rotation body 72e and rotate while receiving driving force from a rotary driving part 72d. Hereby, a circular end part of the wafer WA is positioned and arranged in a predetermined inspection location provided in the first outer periphery inspection unit 73a etc., while it becomes possible to move the outer periphery end part of the wafer WA along the circumference direction at a desired timing and speed by rotation of the rotation body 72e.

As shown in FIG. 2A, the first outer periphery inspection unit 73a for an upper surface is provided with an outer periphery illuminating unit 11 that illuminates from the upper side the outer peripheral region of wafer WA being the target, and an outer periphery imaging unit 12 for imaging from the upper side the outer peripheral region of wafer WA being a target. The outer periphery illuminating unit 11 has a first arcuate illuminating unit 11a, a first slope-illuminating unit 11b, a first episcopic illuminating unit 11c, and a frame part 11j. The first arcuate illuminating unit 11a has an arcuate outer shape having a rectangular cross-section, and an arcuate corner part 14a in the inside serves as a light ejection part 14b. The first slope-illuminating unit 11b has a reflecting part 15a arranged in an sloping state while facing a place through which a bevel, which is a sloping part of the outer peripheral region of the wafer WA, passes, and a light supplying part 15b arranged facing the reflecting part 15a and for supplying illumination light to the reflecting part 15a. The first episcopic illuminating unit 11c is assembled to an optical imaging system 17a of the outer periphery imaging unit 12 to supply illumination light to the lower side of the optical imaging system 17a.

Accompanying the first arcuate illuminating unit 11a, a first position-adjustment mechanism 18a is provided, and accurate positioning of the first arcuate illuminating unit 11a relative to the frame part 11j is made possible. Accompanying the first slope-illuminating unit 11b, a second position-adjustment mechanism 18b is provided, and accurate positioning of the first slope-illuminating unit 11b relative to the frame part 11j is made possible. Accompanying the outer periphery imaging unit 12, a third position-adjustment mechanism 18c is provided, and accurate positioning of the outer periphery imaging unit 12 relative to the frame part 11j is made possible.

Figure 3A:
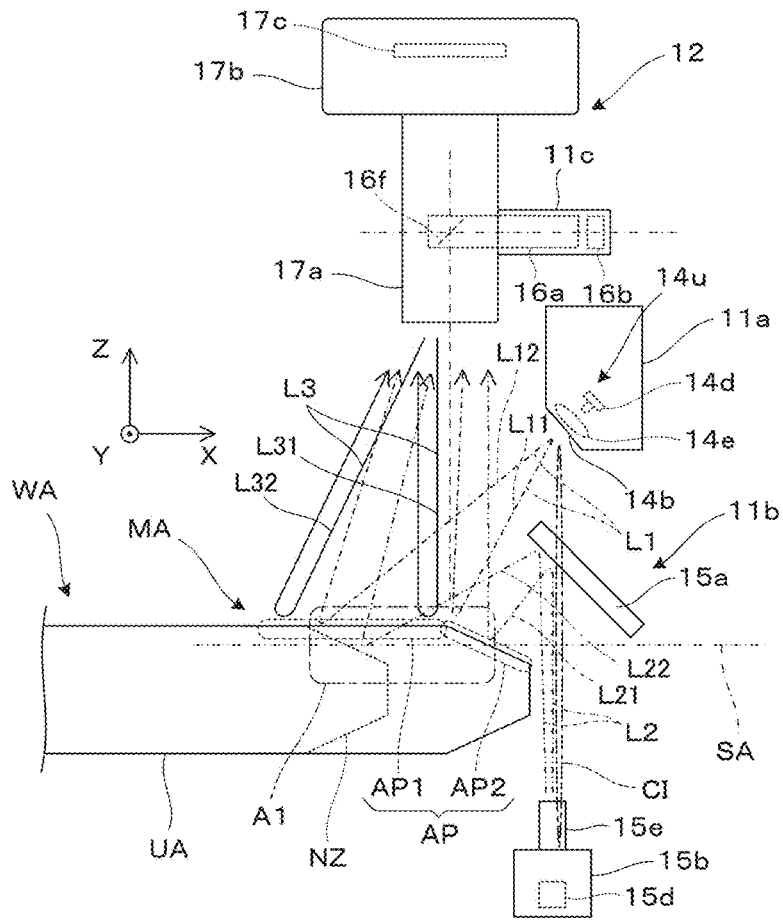
FIG. 3A is a conceptual side cross-sectional view that explains a structure of the first outer periphery imaging unit in FIG. 2A.
Figure 3B:
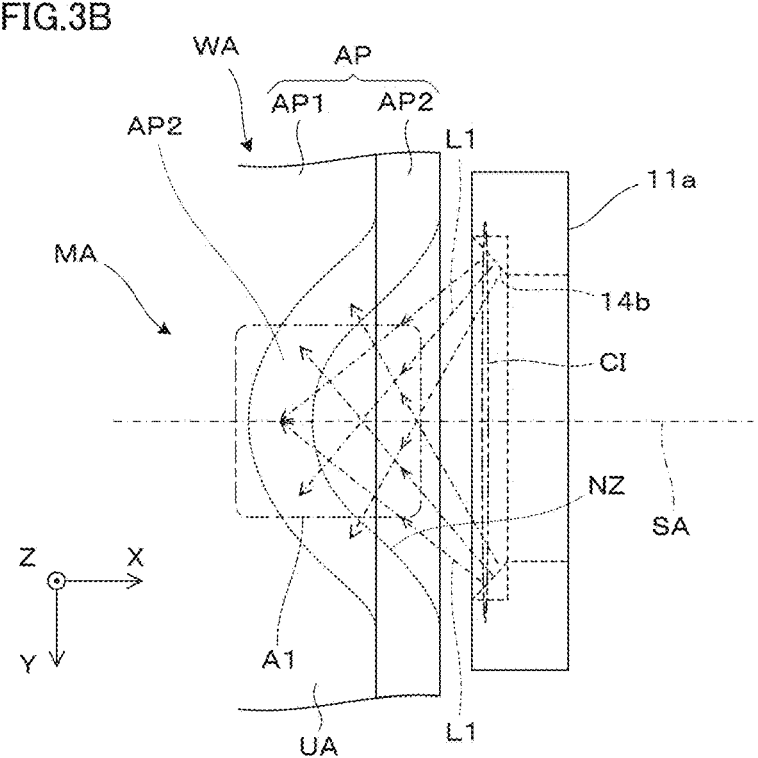
FIG. 3B is a conceptual plan view that explains mainly a structure of a first arcuate illuminating unit.

As shown in FIG. 2A, FIGS. 3A and 3B, the first arcuate illuminating unit 11a is arranged in an arch-like shape obliquely above a measurement place MA through which a measurement part of the wafer WA passes. More specifically, the first arcuate illuminating unit 11a is arranged along a partial region of a circumference CI centering on a reference axis SA that extends horizontally along an X-Y plane to illuminate a predetermined region A1 on the reference axis SA. Here, the reference axis SA not only crosses a tangent direction along which an outer peripheral part UA of the wafer WA as a target extends, but also extends in the X direction that crosses orthogonally the tangent direction and is parallel with the wafer WA upper surface. The first arcuate illuminating unit 11a is arranged in an angle range of around 120° surrounding the reference axis SA and in an angle range of not more than 180°, preferably not more than 160°.

The arcuate corner part 14a of the first arcuate illuminating unit 11a is the light ejection part 14b that ejects illumination light L1, where, in a vicinity lying at the inner part of the light ejection part 14b and along the circumference CI, plural emission units 14u are arranged at regular intervals and eject the illumination light L1 so as to be gathered at the apex of a cone along a side region of the cone allowing it to enter the predetermined region A1. Here, each emission unit 14u is composed of a light source 14d such as a solid light emitting device or the like for generating white light and a lens 14e for adjusting divergent angles and ejects illumination light L1 having predetermined spread. As the result, a three-dimensional region obtained by expanding a saddle-like curved surface as a nucleus or a core with thickness corresponding to a divergent angle from the emission unit 14u, that is, a three-dimensional region obtained by expanding a hyperboloid of one sheet within a predetermined angle region surrounding a symmetry axis as a nucleus with thickness corresponding to a divergent angle from the emission unit 14u is illuminated with the first arcuate illuminating unit 11a as the predetermined region A1, and this predetermined region A1 is illuminated from various directions in an angle range near a half of the apex angle of a cone fitted to the hyperboloid of one sheet, by the illumination light L1.

Figure 4A:
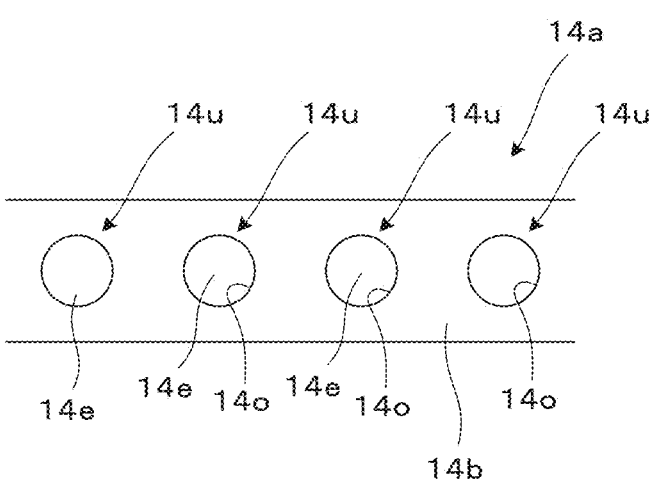
FIG. 4A is a conceptual view that explains an emission pattern at a corner part of the first arcuate illuminating unit.

FIG. 4A is a conceptual view that explains an emission pattern in the corner part 14a of the first arcuate illuminating unit 11a. In the illustrated example, in the corner part 14a, openings 14o of the emission unit 14u are arranged in one line at regular intervals. From a lens 14e arranged to each opening 14o, illumination light L1 is ejected.

Figure 4B:
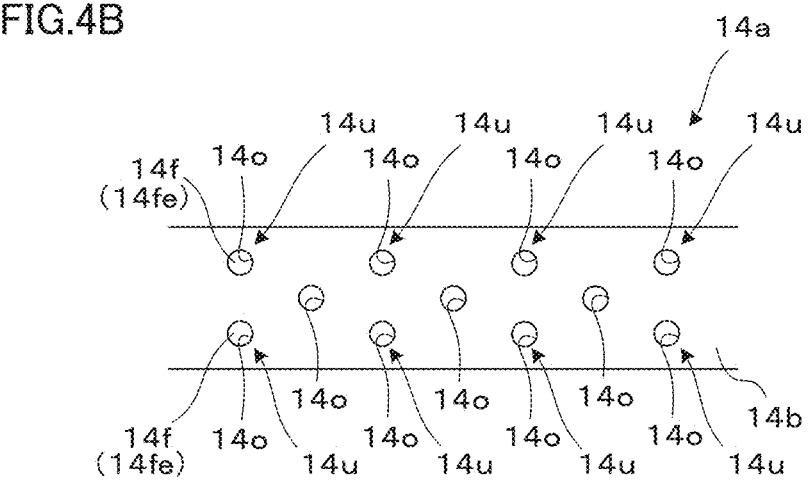
FIG. 4B is a view that explains a modified example of the emission pattern of the corner part.

FIG. 4B is a view that explains a modified example of emission pattern in the corner part 14a. In this instance, plural rows of openings 14o are arranged in a zigzag alignment along the corner part 14a. The opening 14o has a relatively small diameter, and, in the inside of the opening 14o, an edge part 14fe of an optical fiber 14f is arranged. Light from a light source, illustration of which is omitted, is diverted into plural optical fibers 14f, and the illumination light L1 is ejected from the edge part 14fe of each optical fiber 14f. Meanwhile, to the edge part 14fe of the optical fiber 14f, an optical element such as a cylindrical lens, prism can be arranged. By arranging a cylindrical lens or prism to the foregoing stage of the opening 14o, a spread form or an ejection direction of the illumination light L1 can be adjusted. Such optical elements may be those provided individually for edge parts 14fe of plural optical fibers 14f, or may be one that extends over the whole of the corner part 14a in common for edge parts 14fe of plural optical fibers 14f.

Figure 5:
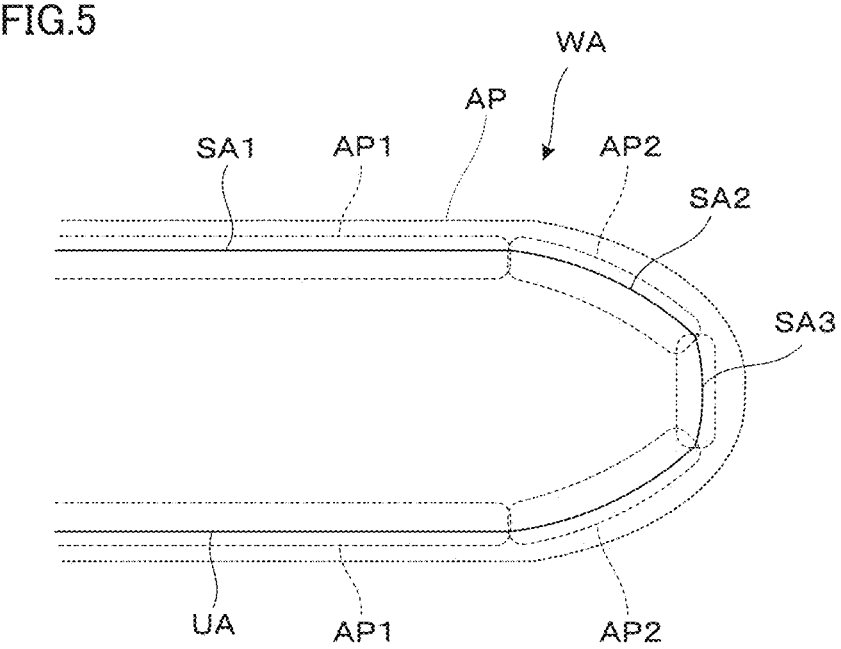
FIG. 5 is a side cross-sectional view that explains an outer peripheral region of a target.

FIG. 5 is a view that shows the outer peripheral part UA or an outer peripheral region AP of the wafer WA, with a vertical cross-section that passes through the center of the wafer WA. The outer peripheral region AP of the wafer WA contains a flat part AP1 and a sloping part AP2 on the front surface side. The flat part AP1 has a mirror surface SA1 that exposes a crystal plane, and the sloping part AP2 is a chamfered bevel part and has a sloping surface SA2. The outer peripheral region AP of the wafer WA contains the flat part AP1 having the mirror surface SA1 and the sloping part AP2 having the sloping surface SA2 also on the rear surface. In the outer peripheral region AP, outside the sloping surface SA2, an outer periphery end surface SA3 has been formed. Meanwhile, the above was explanation of parts without a notch NZ (FIG. 3A) in the outer peripheral region AP, but parts with the notch NZ have a cross-section shape similar to that shown in FIG. 5.

Returning to FIG. 3A etc., the illumination light L1 from the first arcuate illuminating unit 11a enters a place through which a boundary location between the flat part AP1 and the sloping part AP2 outside the flat part AP1, or a vicinity, passes. Specifically, the illumination light L1 enters mainly the boundary location between the flat part AP1 and the sloping part AP2 and the circumference thereof as illumination light L11 in a region without the notch NZ in the outer peripheral region AP, and enters the boundary location relative to the sloping part AP2 or the flat part AP1 in the notch NZ as illumination light L12 in a region with the notch NZ in the outer peripheral region AP, from various angle directions around the reference axis SA. As the result, regardless of whether it is a region with the notch NZ or a region without the notch NZ, the boundary between the flat part AP1 and the sloping part AP2 or the sloping part AP2 is illuminated from an oblique direction, and photographing of a bright image of the boundary between the flat part AP1 and the sloping part AP2 or the sloping part AP2 by the outer periphery imaging unit 12 becomes possible.

In the first slope-illuminating unit 11b, the reflecting part 15a is a highly reflective film that expands in a plane-like shape, but it may have a curvature. Moreover, the reflecting part 15a may also have a moderate diffusing property. In an instance where the reflecting part 15a has a light diffusing property, the divergent angle of illumination light L2 can be adjusted with respect to a longitudinal direction or horizontal direction on the basis of the plane of the reflecting part 15a. The light supplying part 15b has a light emitting part

15*d* and a projection optics system 15*e*. The light emitting part 15*d* may set, for example, a solid light emitting device for generating white light or the like as a light source, but it is also possible to guide light from a light source for generating white light with a light guide to form a light emitting surface for ejecting white light. In a region without the notch NZ in the outer peripheral region AP, the illumination light L2 from the first slope-illuminating unit 11*b* enters the sloping part AP2 from an oblique direction as illumination light L21 to illuminate the sloping part AP2 from an oblique direction in a spot shape. Also, in a region with the notch NZ in the outer peripheral region AP, the illumination light L2 from the first slope-illuminating unit 11*b* enters the sloping part AP2 from an oblique direction as illumination light L22 to illuminate the sloping part AP2 from an oblique direction in a spot shape.

The first episcopic illuminating unit 11*c* has an optical coupled system 16*a* and a light supplying part 16*b*. The coupled optical system 16*a* has a half mirror 16*f* for introducing to illumination light L3 to the optical imaging system 17*a* of the outer periphery imaging unit 12, to allow coaxial episcopic illumination. The light supplying part 16*b* may set, for example, a solid light emitting device that generates white light, or the like, as a light source, but it is also possible to guide light from a light source that generates white light with a light guide to form a light emitting surface for ejecting white light. The illumination light L3 from the first episcopic illuminating unit 11*c* enters the flat part AP1 in the outer peripheral region AP as illumination lights L31, L32, and illuminates uniformly the flat part AP1.

The outer periphery imaging unit 12 has the optical imaging system 17*a* and an imaging unit 17*b*. The optical imaging system 17*a* projects an image of the outer peripheral region AP of the wafer WA on the imaging unit 17*b*. The imaging unit 17*b* has a line sensor 17*c* of CMOS or the like, and acquires a line image in a radial direction of the outer peripheral region AP. The wafer WA can be subjected to constant-speed rotation at a desired speed in the plane of wafer WA in a state supported on the support arm 72*b*, and therefore, by joining together line images, a two-dimensional image of the outer peripheral region AP can be obtained. As the result, regions with the notch NZ, or regions without the notch NZ in the outer peripheral region AP of the wafer WA can be photographed as desired. On this occasion, by the illumination light L1 from the first arcuate illuminating unit 11*a*, the illumination light L2 from the first slope-illuminating unit 11*b*, and the illumination light L3 from the first episcopic illuminating unit 11*c*, the flat part AP1 and the sloping part AP2 composing the outer peripheral region AP are illuminated with a moderate degree, and an even bright image can be acquired with respect to the flat part AP1 and sloping part AP2.

As shown in FIG. 2B, the second outer periphery inspection unit 73*b* for the lower surface is provided with an outer periphery illuminating unit 111 for illuminating an outer peripheral region of the wafer WA being a target from the lower side, and an outer periphery imaging unit 112 for imaging an outer peripheral region of the wafer WA being the target from the lower side. The outer periphery illuminating unit 111 has a second arcuate illuminating unit 111*a*, a second slope-illuminating unit 111*b*, a second episcopic illuminating unit 111*c* and the frame part 11*j*, in the same way as the first outer periphery inspection unit 73*a* shown in FIG. 2A. The second arcuate illuminating unit 111*a* is reversed vertically as compared with the first arcuate illuminating unit 11*a*, but has the same structure as the first arcuate illuminating unit 11*a* and, therefore, the same symbol is given and duplicated explanation is omitted. In the same way, the second slope-illuminating unit 111*b* is reversed vertically as compared with the first slope-illuminating unit 11*b*, but has the same structure as the first slope-illuminating unit 11*b*, and therefore, the same symbol is given and duplicated explanation is omitted. The second episcopic illuminating unit 111*c* is reversed vertically as compared with the first episcopic illuminating unit 11*c*, but has the same structure as the first episcopic illuminating unit 11*c*. The outer periphery imaging unit 112 is reversed vertically as compared with the outer periphery imaging unit 12 shown in FIG. 2A, but has the same structure as the outer periphery imaging unit 12.

FIG. 6 is a view that explains an outline of operation of the outer periphery inspection unit 23. The control part 91 makes the first outer periphery inspection unit 73*a* operate while rotating the wafer WA in a horizontal plane with the retentive part 72, photographs the outer peripheral region AP of the wafer WA from the upper side, and acquires images of the flat part AP1 and the sloping part AP2 on the upper side (or front side) (Step S11). In parallel with this or at a different timing, the control part 91 makes the second outer periphery inspection unit 73*b* operate while rotating the wafer WA in a horizontal plane with the retentive part 72, photographs the outer peripheral region AP of the wafer WA from the lower side, and acquires images of the flat part AP1 and the sloping part AP2 on the lower side (or rear side) (Step S12). The control part 91 stores the upper side image of the outer peripheral region AP obtained at Step S11 and the lower side image of the outer peripheral region AP obtained at Step S12 in a recording unit, and presents the front side outer periphery image and the rear side outer periphery image to an operator of the inspection device 100 (Step S13). Consequently, an operation such as displaying front and rear images with respect to the notch NZ becomes possible.

Figure 7A:
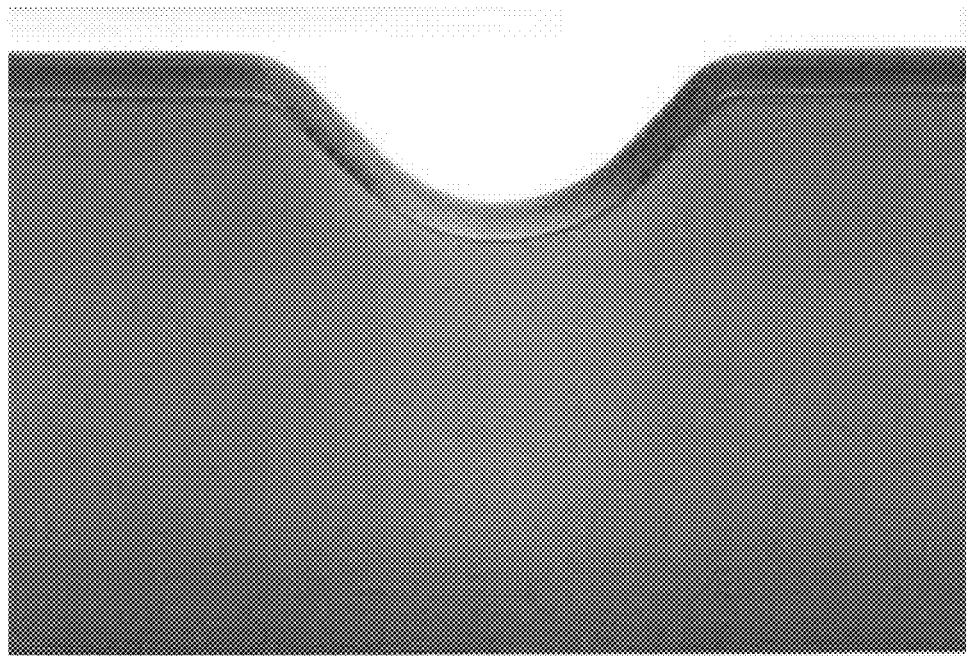
FIG. 7A is a view that explains an outer periphery image acquired with an inspection device in a specific Example.
Figure 7B:
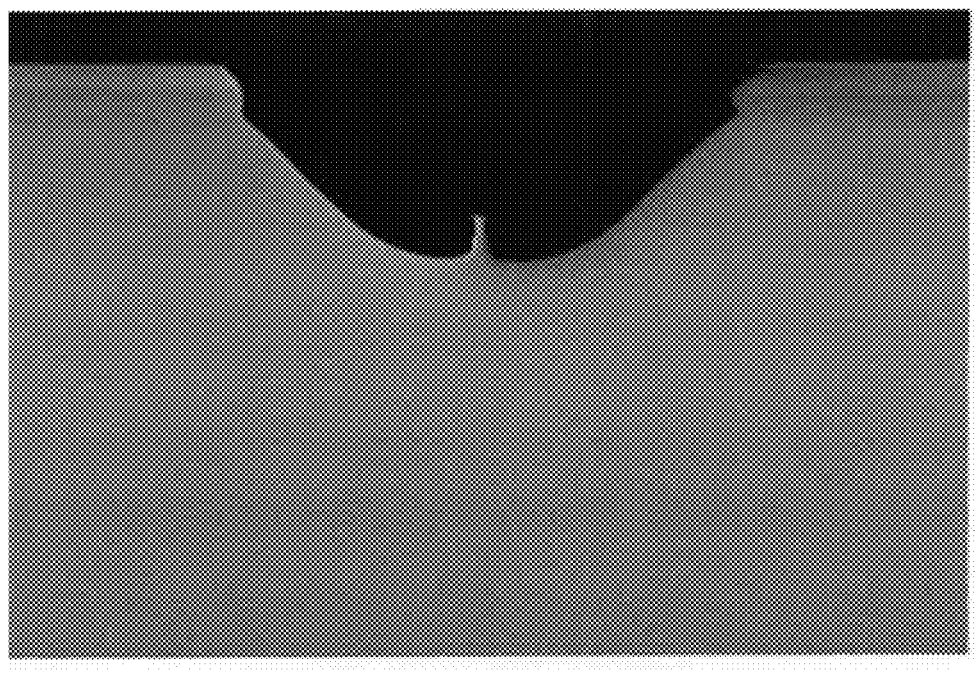
FIG. 7B is a view that explains an outer periphery image acquired with an inspection device in a Comparative Example.

FIG. 7A shows an outer periphery image obtained with an inspection device in a specific Example, and FIG. 7B shows an outer periphery image obtained with an inspection device in Comparative Example. In the instance of Example shown in FIG. 7A, a notch or sloping part is clearly depicted, and chipping and other defects can be captured reliably. On the other hand, the image in Comparative Example shown in FIG. 7B is one photographed using a C type ring illumination device in place of the first arcuate illuminating unit 11*a* and the first slope-illuminating unit 11*b*. On this occasion, the C type ring illumination device is arranged so that a subject axis thereof extends in parallel to the tangent line of the outer periphery end surface of the wafer WA, and is arranged so as to sandwich upper and lower surfaces in a place to neighboring the imaging unit in the outer periphery end part of the wafer WA with a pair of facing open ends. In the instance of Comparative Example shown in FIG. 7B, an image is given in which a sloping part is lost with respect to the notch, and boundary between the flat part and sloping part cannot be detected and the sloping part cannot be said to be clear except for the notch.

In the above, the inspection device 100 according to the embodiment has been explained, but the inspection device according to the present invention is not limited to the above. For example, the reference axis SA of the arcuate illuminating units 11*a*, 111*a* may not be one extending in parallel to the wafer WA upper surface, but it may be one having a suitable sloping angle or tilt angle relative to the wafer WA upper surface. Moreover, the reference axis SA may not be one extending in the X direction orthogonal to the tangent direction along which the outer peripheral part UA of the wafer WA extends, but it may be one extending in a direction crossing the tangent direction, that is, a direction having a suitable sloping angle relative to the orthogonal direction to the tangent direction.

Arcuate illuminating units 11a, 111a may be one in which plural arcuate illuminating units of a similar structure are combined. Moreover, slope-illuminating units 11b, 111b may be omitted, as usage.

In the above, inspection of wafer WA of a semiconductor crystal or the like has been explained, but a target of inspection is not limited to a semiconductor wafer and it may be a glass substrate etc. In an instance where a target of inspection is a glass substrate, the outer periphery of the target becomes circular or rectangular, and, in an instance where an outer periphery of a target is rectangular, generally an orientation flat is formed at a diagonal part. The orientation flat has been subjected to chamfering by an R plane at boundary. Also on an occasion when such orientation flat and the surroundings thereof are to be observed, illumination of an inflexion point or singular point becomes possible by first arcuate illuminating units 11a, 111a to make observation possible without an oversight. In an instance where a rectangular glass substrate is inspected, the glass substrate can be moved linearly without rotation, or alternatively, distance from the rotation axis of the glass substrate to the outer periphery imaging unit 12 can be altered.

In the outer periphery inspection unit 23, the notch camera part 75, the laser box part 77, the edge camera part 79 etc. can be omitted.

The optical imaging system 17a of the outer periphery imaging unit 12 is not limited to one composed of the line sensor 17c, but it may be composed of a two-dimensional imaging device like a CMOS sensor. In this instance, plural images obtained while rotating the wafer WA with the retentive part 72 are to be joined together. Furthermore, the line sensor 17c may be one in which light quantity or level sensors such as a photo diode are aligned in one line at suitable intervals.

In the inspection device 100, that is, in an outer periphery and rear surface defect inspection multifunction machine, the rear surface/PH inspection unit 25 can be omitted.

In the outer periphery inspection unit 23 of the inspection device 100, only outer periphery inspection units 73a, 73b may be taken out to be combined with a machine such as a processing machine or the like.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An inspection device, comprising:
   an arcuate light source that is arranged along a partial region of a circumference centered around a reference axis where a plane formed by the circumference is perpendicular to the reference axis, and illuminates a predetermined region on the reference axis, the predetermined region is located at an outer peripheral region of a target; and
   an outer periphery imager configured to image the outer peripheral region of the target, wherein
   the reference axis is parallel to the upper surface of the target and passes through the center of the target and the center of the illuminated predetermined region of the outer peripheral area of the target.

2. The inspection device according to claim 1, wherein the predetermined region on the reference axis corresponds to a place through which a boundary location between a flat part and a sloping part outside the flat part, or a vicinity thereof, in the outer peripheral region of the target passes.

3. The inspection device according to claim 2, wherein the reference axis of the arcuate light source extends in parallel to the flat part.

4. The inspection device according to claim 2, wherein the arcuate light source is arranged within an angle range of not more than 180° around the reference axis.

5. The inspection device according to claim 1, further comprising a slope-illuminating light source configured to illuminate, from an oblique direction, a place through which the outermost sloping part in the outer peripheral region of the target passes.

6. The inspection device according to claim 5, wherein the slope-illuminating light source has
   a reflector that is arranged facing a place through which the place through which the outermost sloping part in the outer peripheral region of the target passes, and
   one or more light elements each configured to supply illumination light to the reflector.

7. The inspection device according to claim 6, wherein the reflector has a light diffusing property.

8. The inspection device according to claim 1, further comprising an episcopic illuminating light source that is built in the outer periphery imager and illuminates a flat part in the outer peripheral region of the target.

9. The inspection device according to claim 1, further including a transport part which turns over the target to a retainer configured to support the target at an inspection location for inspecting an outer periphery of the target and having the arcuate light source and the outer periphery imager.

10. The inspection device according to claim 9, further including plural additional inspection locations for inspecting an outer periphery of the target with a mechanism different from that of the inspection location having the arcuate illuminating unit and the outer periphery imaging unit.

* * * * *